3,556,988
METHOD OF PREPARING COMPOSITE CATALYST
AND HYDROCARBON CONVERSION THEREWITH
William A. Stover, Woodbury, and Harry A. McVeigh,
  Gibbstown, N.J., assignors to Mobil Oil Corporation,
  a corporation of New York
No Drawing. Continuation-in-part of application Ser. No.
  701,026, Dec. 26, 1967, which is a continuation-in-part
  of application Ser. No. 627,429, Mar. 31, 1967. This
  application Jan. 29, 1969, Ser. No. 795,025
              Int. Cl. C10g 11/02; B01j 11/06
U.S. Cl. 208—120                                13 Claims

ABSTRACT OF THE DISCLOSURE

Composite catalyst made by admixing with an aqueous alkali metal silicate a particulate weighting agent such as clay, desirably dispersed in water, so as to coat the clay with alkali metal silicate, ageing at a pH of from about 8 to 10, optionally adding a source of zirconia or alumina and zirconia, reducing the pH to about 4.0 to 7.0 to form a siliceous gel-weighting agent-matrix slurry, admixing therewith a slurry of rare earth crystalline aluminosilicate, drying in the form of particles suitable for fluid catalytic conversion, exchanging with ammonium ions to reduce alkali metal content; and post exchanging with rare earth ions or aluminum ions to substantially replace ammonium ions and to remove residual alkali metal ions.

CROSS-REFERENCES TO RELATED APPLICATIONS

This application is a continuation-in-part of our application Ser. No. 701,026, entitled "Catalyst Matrix Material, Composite Catalyst, and Methods of Preparing Same," filed Dec. 26, 1967, which in turn is a continuation-in-part of our application Ser. No. 627,429 entitled "Composite Catalyst and Method of Preparing Same," filed Mar. 31, 1967, now abandoned.

BACKGROUND OF THE INVENTION (1) Field of the invention

During catalytic conversion, such as of high boiling hydrocarbons to lower boiling hydrocarbons, the reaction which takes place is accompanied by a number of complex side reactions, such as aromatization, polymerization, alkylation, and the like. As a result of these complex reactions, a hydrocarbonaceous deposit commonly called "coke" is laid down on the catalyst. The deposition of coke tends to impair catalytic efficiency for the principal reaction. As will be realized, undesired products, such as coke, generally are formed at the expense of useful products, such as gasoline. It will also be evident that during the period of regeneration, the catalyst is not being effectively employed for conversion purposes. Hence, a catalyst exhibiting relatively less sensitivity to coke would be highly desirable.

In addition to the desirable properties of high activity and selectivity found in commercial catalytic compositions, it is essential for economic use that a catalyst possess high stability, that is, the ability to maintain high levels of activity and selectivity for extended periods of use in catalytic conversion. The maintenance of high selectivity and activity is, therefore, a measure of catalyst stability.

Thus, a modern conversion catalyst necessarily possesses, in addition to high catalytic activity, the equally desirable properties of high selectivity and stability.

The present invention provides a catalyst unusually suited in each of these respects.

(2) Description of the prior art

Our patent application Ser. No. 701,026 describes a composite catalyst prepared by dispersing particles of crystalline aluminosilicate in a matrix of siliceous oxide gel-clay. The composite catalyst described therein is characterized by unusual activity and selectivity. Of course, a catalyst having even greater activity while maintaining selectivity would be of considerable interest.

SUMMARY OF THE INVENTION

The present invention provides a method of making composite catalyst characterized by unusually high activity and excellent selectivity.

Such composite catalyst is made up of crystalline rare earth aluminosilicate particles contained in a matrix made up of a weighting agent, desirably clay, and a siliceous gel, e.g., silica, silica-zirconia, or silica-zirconia-alumina.

The foregoing composite is made by admixing with an aqueous alkali metal silicate a particulate weighting agent such as, e.g., a kaolin clay, desirably as a dispersion in water, so as to coat the clay particles with alkali metal silicate. This admixing is conveniently done at room temperature although, of course, higher or lower temperatures may be employed if desired. The mixture is then heated, generally to a temperature of from about 100° to 160° F. and acid is added to adjust the pH to from about 8 to 10. This temperature is maintained for a time of about 1 to 6 hours or longer. At this point, if a silica-zirconia-weighting agent (e.g., clay) matrix is desired, a zirconium salt is added, desirably as an aqueous solution thereof. If alumina is desired as a third synthetic amorphous inorganic oxide component, then a source of aluminum ions, e.g., aluminum sulfate, is also added. Acid is then added to reduce the pH to about 4 to 7 and form a silica gel-weighting agent or silica gel-zirconia gel-weighting agent slurry, which is then admixed with a slurry of crystalline aluminosilicate. The resulting composite is separated and dried in the form of particles suitable for fluid catalytic conversion. This is followed by treatment with ammonium ions to remove residual alkali metal ions from the composite, and thereafter with a treatment with rare earth ions, aluminum ions, or mixtures thereof, to substantially remove all alkali metal content and to replace ammonium ions with rare earth ions.

The composite catalysts of our invention show high activity, excellent selectivity and are particularly desirable in having low coking tendencies. This is of great value when dealing with "dirty" feed stocks, e.g., heavy gas oils and "recycle" stocks, which ordinarily give off appreciable coke yields when subjected to cracking.

DESCRIPTION OF SPECIFIC EMBODIMENTS

The composite catalysts of our invention are made up of crystalline aluminosilicate particles having a sodium content of less than about 4 percent by weight, these particles being contained in a porous matrix of (1) a synthetic amorphous siliceous gel, i.e., silica gel, silica-zirconia gel, or silica-zirconia-alumina gel, such synthetic amorphous siliceous gel having a pore volume of at least 0.6 cc. per gram, together with (2) a weighting agent, preferably clay, in such amount as to yield a resulting composite having a packed density of at least 0.3 gram per cc. (It is to be understood that when reference is made herein to properties of the composite such as, e.g., packed density, or to properties of the amorphous siliceous gel such as, e.g., pore volume, these references are to the fresh catalyst composite, i.e., to the composite prior to its actual use in catalytic conversion, but subsequent to the removal of water therefrom, as by heating to a temperature of 1200° F. for three hours in substantially dry air.)

Referring to the synthetic amorphous siliceous component of the composite catalyst matrix, it is essential that such synthetic amorphous component have a pore volume of at least 0.6 cc. per gram. In general, the higher the pore volume, the more desirable is the overall composite catalyst, of course, provided that the pore volume is not so high as to adversely affect the attrition resistance of the catalyst. Thus, the pore volume of the synthetic amorphous material is generally from about 0.6 to 1.5 cc. per gram, a more preferred range being from about 0.8 to 1.3 cc. per gram. The most preferable pore volume range is from about 1 to 1.2 cc. per gram.

In addition, and as will be discussed in greater detail hereinafter, it is advantageous that the synthetic amorphous material be such that, if used alone, it would be characterized by substantially no catalytic activity. By "substantially no catalytic activity" we mean that the alpha ($\alpha$) value (defined in detail hereinafter) for the silica gel or silica-zirconia gel is less than 0.1, and desirably less than 0.05.

The matrix for our composite catalyst additionally includes a weighting agent. The most preferred weighting agent is kaolin clay. Other weighting agents may be substituted, in whole or in part, for kaolin clay, so long as such weighting agents do not react with the high porosity silica gel to form compounds that would cause an appreciable change in the pore volume-surface area relationship of the finished catalyst. The amount of weighting agent employed should be such that the final composite catalyst has a packed density of at least 0.3 gram per cc. Generally the packed density of the composite catalyst will be from about 0.3 to 1 gram per cc., a more preferred range being from about 0.4 to 0.6 gram per cc.

In the make up of the matrix, the relative proportions as between the synthetic amorphous siliceous material and weighting agent are advantageously from about 20 to 95% by weight of synthetic amorphous material and from about 5 to 80% by weight of weighting agent. A more preferred range is one wherein the synthetic amorphous material is from about 50 to 70 weight percent of the matrix and the weighting agent is from about 30 to 50 weight percent of the matrix.

Crystalline aluminosilicate particles are dispersed in the foregoing matrix, generally in such quantity that the overall composite contains from about 1 to 80% by weight of such crystalline aluminosilicate particles. Preferably, the composite will contain from about 2 to 20% by weight of crystalline aluminosilicate particles, the most preferred range being from about 5 to 10% by weight.

In preparing our composite catalyst, the particulate weighting agent, e.g., clay, is dispersed in liquid medium, preferably water, to form a dispersion. Advantageously the concentration of weighting agent in the dispersion is from about 0.5 to 10% by weight, and most preferably from about 1 to 3% by weight. The foregoing dispersion is intimately admixed with alkali metal silicate so as to coat the particles of weighting agent therewith. Thus, aqueous alkali metal silicate may be slowly added to the weighting agent dispersion with thorough mixing. The mixing is conveniently carried out at room temperature, although if desired, lower or higher temperatures may be employed. The relative proportions as between the weighting agent dispersion and alkali metal silicate solution are not critical, and merely require that there be present sufficient alkali metal silicate to assure that the particles of weighting agent are coated therewith. Hence, the mixing is thorough so as to insure that the clay is uniformly dispersed and coated with alkali metal silicate.

After mixing, the admixture is subjected to heat ageing, e.g., at a temperature of the order of 120° F. although higher or lower temperatures may of course be employed, suitably in the range of from about 80 to 160° F., at a pH of from about 8 to 10 so as to obtain a high pore volume silica gel. Thus, sufficient acid is added to reduce the pH to from about 8 to 10, and preferably from about 9.5 to 10. Desirably, sulfuric acid is employed to effect such reduction in pH. The silica concentration at this point will typically be from about 4 to 7% by weight.

If the synthetic amorphous component of the matrix is to be silica-zirconia gel or silica-zirconia-alumina gel rather than silica gel alone, then at this juncture a source of zirconium ions, or a source of zirconium ions and a source of aluminum ions, are added. The aluminum ion source is desirably a water soluble aluminum salt such as aluminum sulfate, aluminum nitrate, sodium aluminate or the like, with aluminum sulfate being preferred. The source of zirconium ions typically is in the form of a zirconium salt, e.g., zirconium sulfate, sodium zirconium silicate, or the like. Where sodium zirconium silicate is used, sulfuric acid is also employed, thereby resulting in zirconium sulfate. Desirably, an aqueous solution of the zirconium salt is employed.

Neither the concentration nor the amount of zirconium salt solution and aluminum salt solution employed is critical. Thus, the concentration and/or the amount may each be adjusted so as to achieve the desired level of zirconia or zirconia and alumina in the overall silica-zirconia-weighting agent matrix or silica-zirconia-alumina-weighting agent matrix.

By way of illustration, the concentrations of the zirconium salt solution may be of the order of 1% by weight to 30% by weight or even higher, a preferred range being from about 5 to 20% by weight, the most preferred range being from about 10 to 15% by weight. Similarly, the concentration of the aluminum salt solution, if one is employed, may be from about 1 to 30% by weight.

Likewise, the temperatures of the zirconium salt solution and aluminum salt solutions are not at all critical. It is generally most convenient to make up the solution at ambient temperature conditions and then add it, although higher or lower temperatures may of course be employed.

Where zirconia is to be present as a component of the silica-weighting agent matrix, it is desirable that the zirconia level of the synthetic amorphous material (silica gel-zirconia gel or silica-zirconia-alumina gel) be from about 0.5 to 25% by weight on a dry basis. A more preferred range is from about 1 to 10%, with the most preferred range being from about 2 to 5%. As previously pointed out, the desired zirconia level is readily obtained by appropriate selection of concentration and/or amount of zirconium salt solution employed. Where alumina is preferred, a desirable level of alumina in the amorphous material is from about 0.2 to 5% by weight on a dry basis, a more preferred range being from about 0.5 to 1% by weight.

Thereafter, the mixture, which may or may not contain either zirconium ions or aluminum and zirconium ions, depending upon whether a zirconium salt solution or an aluminum salt solution and zirconium salt solution have been added thereto, may, if desired, be heated to a temperature of from about 100 to 160° F., or even higher, and maintained at such temperature for typically from about 1 to 6 hours. Longer ageing times may be employed, but to no particular advantage. As will be apparent, in general, the higher the temperature, the less the time required at that temperature to effect ageing.

Thus, the ageing could be carried out at temperatures as low as, e.g., room temperature, but then the time requirements for such ageing would be considerable and the process, uneconomical.

After heat-ageing, sufficient acid (desirably sulfuric) is added with agitation to reduce the pH to from about 4 to 7 and preferably to from about 4.0 to 5.0, 4.5 to 5.0 being advantageous and 4.0 to 4.5 being most preferred, thereby forming a synthetic amorphous gel oxide (silica gel, silica-zirconia gel, or silica-zirconia-alumina gel)-weighting agent matrix slurry wherein the amorphous gel oxide is characterized on a dry basis, by a pore volume of at least 0.6 cc./gram.

Considering the particulate weighting agent, where it is other than a kaolin clay the prime requirement is that it be of a material that does not react with the high porosity synthetic amorphous gel oxide to such extent as to form a compound that would cause an appreciable change in the pore volume-surface area relationship of the finished catalyst. Suitable other weighting agents include alpha alumina, zircon, mullite, alumina monohydrate, alumina trihydrate, halloysite, sand, $TiO_2$, silicon, metals such as aluminum and titanium, etc.

The mean particle size of the weighting agent which is incorporated as one component of the matrix is desirably less than about 40 microns. Preferably the particle size is from about 0.1 to 20, and most preferably from about 2 to 10 microns.

To the foregoing synthetic amorphous oxide gel-weighting agent matrix slurry there is added a slurry of crystalline alumino-silicate particles.

Suitable crystalline aluminosilicates for use in the composite catalysts of our invention are described in U.S. Pat. 3,140,249 as well as U.S. Pat. 3,140,253, both incorporated herein by reference. Representative crystalline aluminosilicates suitable for the present invention include those natural and synthetic crystalline aluminosilicates having uniform pores of a diameter preferably between about 3 and 15 angstrom units. Such crystalline aluminosilicates include zeolited Y, X, A, L, D, R, S, T, Z, E, F, Q, B, ZK-4, ZK-5, as well as naturally occurring zeolites including chabazite, faujasite, mordenite, and the like. Crystalline aluminosilicates having pore diameters between about 3 and 5 angstrom units may be suitable for size-selective conversion catalysis, while crystalline aluminosilicates having pore diameters between about 6 and 15 angstrom units are preferred for hydrocarbon conversion such as catalytic cracking and the like. Preferred crystalline aluminosilicates include synthetic faujasite or zeolites X and Y, with particular preference being accorded zeolite Y.

The crystalline aluminosilicate particles employed as a component in the catalyst compositions of the present invention are essentially characterized by a high catalytic activity.

This high catalytic activity may be imparted to the particles by base exchanging alkali metal aluminosilicate particles—either before or after dispersion thereof in the matrix—with a base-exchange solution containing ions selected from the group consisting of cations of elements of Groups IB-VIII of the Periodic Table, hydrogen, and hydrogen precursors, including mixtures thereof with one another. Hydrogen precursors, such as ammonia and ammonium salts, typically undergo, upon heating, degradation to hydrogen cations in contact with aluminosilicates. Suitable methods of base exchange are described in the aforenoted U.S. Pats. 3,140,249 and 3,140,253.

It is particularly pointed out that the crystalline aluminosilicate component, being of high catalytic activity in the final composite, may be relatively less active upon dispersion into the matrix material. The resulting composite (obtained from incorporation of the crystalline aluminosilicate into the matrix) may be rendered highly active by base exchange, impregnation, or the like.

Where an alkali metal aluminosilicate is employed initially, it is essential to base exchange either the aluminosilicate particles before or after compositing with the matrix to reduce the sodium content of the final product to less than about 4% by weight and preferably less than 1% by weight. The sodium content of the final composite is essentially less than 4% by weight. Such compositions provide high catalytic activity when zeolite Y is the crystalline aluminosilicate component. Preferably, however, and particularly when zeolite X is the crystalline aluminosilicate component, the sodium content of the final composite should be less than 1% by weight.

As previously discussed, base exchange may be accomplished by one or more contacts (before and/or after incorporation of the crystalline aluminosilicate into the matrix) with a solution containing ions selected from the group consisting of cations of the elements of Groups IB-VIII, hydrogen and hydrogen precursors, including mixtures thereof with one another.

It is most preferred that the crystalline aluminosilicate be a rare earth zeolite, that is a crystalline aluminosilicate composition containing rare earth metal cations as a result of treatment with a fluid medium, preferably a liquid medium, containing at least one rare earth metal cation. Rare earth metal salts represent the source of rare earth cation. The product resulting from treatment with a fluid medium is an activated crystalline and/or crystalline-amorphous aluminosilicate in which the structure thereof has been modified primarily to the extent of having the rare earth cations chemisorbed or ionically bonded thereto.

Water is the preferred solvent for the cationic salt, e.g., rare earth metal salt, for reasons of economy and ease of preparation in large scale operations involving continuous or batchwise treatment. Similarly, for this reason, organic solvents are less preferred but can be employed providing the solvent permits ionization of the cationic salt. Typical solvents include cyclic and acyclic ethers such as dioxane, tetrahydrofuran, ethyl ether, diethyl ether, diisopropyl ether, and the like; ketones, such as acetone and methyl ethyl ketone; esters such as ethyl acetate; alcohols such as ethanol, propanol, butanol, etc.; and miscellaneous solvents such as dimethylformamide, and the like.

In carrying out the treatment with the fluid medium, the procedure employed varies depending upon the particular aluminosilicate which is treated. If the aluminosilicate which is treated has alkali metal cations associated therewith, then the treatment with the fluid medium or media should be carried out until such time as the alkali metal cations originally present are substantially exhausted. Alkali metal cations, if present in the treated aluminosilicate, tend to suppress or limit catalytic properties, the activity of which, as a general rule, decreases with increasing content of these metallic cations. On the other hand, if the aluminosilicate which is treated with the desired fluid medium if substantially free of alkali metal cations, i.e., a calcium aluminosilicate, then the treatment need not be carried out until such time as the metal is exhausted since the presence of metals other than alkali metals does not seriously limit catalytic properties. Effective treatment with the fluid medium to obtain a modified aluminosilicate having high catalytic activity will vary, of course, with the duration of the treatment and the temperature at which the treatment is carried out. Elevated temperatures tend to hasten the speed of treatment whereas the duration thereof varies inversely with the general concentration of ions in the fluid medium. In general, the temperatures employed range from below ambient room temperature of 24° C. up to temperatures below the decomposition temperature of the aluminosilicate. Following the fluid treatment, the treated aluminosilicate is washed with water, preferably distilled water, until the effluent wash water has a pH value of wash water, i.e., between 5 and 8. The aluminosilicate material is thereafter analyzed for metallic content by methods well known in the art. Analysis also involves analyzing the effluent wash for anions obtained in the wash as a result of the treatment, as well as determination of and correction for anions that pass into the effluent wash from soluble substances, or decomposition products of insoluble substances, which are otherwise present in the aluminosilicate as impurities.

The treatment of the aluminosilicate with the fluid medium or media may be accomplished in a batchwise or continuous method under atmospheric, superatmospheric or subatmospheric pressures. A solution of rare earth metal cations in the form of a molten material, vapor, aqueous or non-aqueous solution may be passed slowly through a fixed bed of aluminosilicate. If desired, hydrothermal treatment or corresponding non-aqueous treatment with polar solvents may be effected by introducing the aluminosilicate and fluid medium into a closed vessel maintained under autogeneous pressure. Similarly, treatments involving fusion or vapor phase contact may be employed.

Where a rare earth zeolite is desired, a wide variety of rare earth compounds can be employed with facility as a source of rare earth ions. Operable compounds include rare earth chlorides, promides, iodides, carbonates, bicarbonates, sulfates, sulfides, thiocyanates, peroxysulfates, acetates, benzoates, citrates, nitrates, formates, propionates, butylrates, valerates, lactates, malanates, oxalates, palmitates, hydroxides, tartrates, and the like. The only limitation on the particular rare earth metal salt or salts employed is that it be sufficiently soluble in the fluid medium in which it is used to give the necessary rare earth ion transfer. The preferred rare earth salts are the chlorides, nitrates and sulfates.

Repesentative of the rare earth metals are cerium, lanthanum, praseodymium, neodymium, illinium, samarium, europium, gadolinium, terbium, dysprosium, holmium, erbium, thulium, scandium, yttrium, and lutecium.

The rare earth metal salts employed can either be the salt of a single rare earth metal or mixtures of rare earth metals, such as rare earth chlorides of didymium chlorides, As hereinafter referred to, a rare earth chloride solution is a mixture of rare earth chlorides consisting essentially of the chlorides of lanthanum, cerium, neodymium and praseodymium with minor amounts of samarium, gadolinium and yttrium. Rare earth chloride solutions are commercially available and the ones specifically referred to in the examples contain the chlorides of the rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, and other rare earth oxides 0.8% by weight. Didymium chloride is also a mixture of rare earth chlorides but having a lower cerium content. It consists of the following rare earths determined as oxides: lanthanum 45–56% by weight, cerium 1–2% by weight, praseodymium 9–10% by weight, neodymium 32–33% by weight, samarium 5–7% by weight, gadolinium 3–4% by weight, yttrium 0.4% by weight, and other rare earths 1–2% by weight. It is to be understood that other mixtures of rare earth are also applicable for the preparation of the novel compositions of this invention, although lanthanum, neodymium, praseodymium, samarium and gadolinium as well as mixtures of rare earth cations containing a predominant amount of one or more of the above cations are preferred since these metals provide optimum activity for hydrocarbon conversion, including catalytic cracking.

Aluminosilicates which are treated with a fluid medium or media in the manner above described include a wide variety of aluminosilicates both natural and synthetic which have a crystalline or combination of crystalline and amorphous structure.

The aluminosilicates can be described as a three-dimensional framework of $SiO_4$ and $AlO_4$ tetrahedra in which the tetrahedra are cross-linked by the sharing of oxygen atoms whereby the ratio of total aluminum and silicon atoms to oxygen atoms is 1:2. In their hydrated form, the aluminosilicates may be represented by the formula:

$$M_{2/n}O:Al_2O_3:wSiO_2:YH_2O$$

wherein M represents at least one cation which balances the electrovalence of the tetrahedra, n represents the valence of the cation, $w$ the moles of $SiO_2$ and Y the moles of $H_2O$. The cation can be any or more of a number of metal ions, depending upon whether the aluminosilicate is synthesized or occurs naturally. Typical cations include sodium, lithium, potassium, silver, magnesium, calcium, zinc, barium, iron, nickel, cobalt and manganese. Although the proportions of inorganic oxides in the silicates and their spatial arrangements may vary affecting distinct properties in the aluminosilicate, the main charatceristic of these materials is their ability to undergo dehydration without substantially affecting the $SiO_4$ and $AlO_4$ framework.

Aluminosilicates falling within the above formula are well known and, as noted, include synthesized aluminosilicates, natural aluminosilicates, and certain caustic treated clays. Among the aluminosilicates are included zeolites A, Y, L, D, R, S, T, Z, E, F, Q, B, X, levynite, dachiarite, erionite, faujasite, analcite, paulingite, noselite, phillipsite, brewsterite, flatkite, datolite, chabazite, gmelinite, leucite, scapolite, mordenite as well as certain caustic treated clays such as montmorillonite and kaolin families. The preferred aluminosilicates are those having pore diameters of at least about 4 angstroms.

Particularly preferred rare earth zeolites for use in this invention may be made by base exchange of sodium zeolite X with rare earth ions to form rare earth zeolite X (see, e.g., Plank et al. U.S. Pat. 3,140,249, Example 26), and by base exchange of sodium zeolite Y with rare earth ions to form rare earth zeolite Y (see, e.g., Plank et al. application Ser. No. 195,945, filed May 18, 1962, entitled "Catalyst and Conversion of Organic Compounds in the Presence Thereof").

In no instance should there by any more than 0.25 equivalent per gram atom of aluminum of alkali metal associated with the aluminosilicate.

Within the above limits it is preferred that there be a minimum amount of alkali metal cations associated therewith since, as noted, the presence of these metals tends to suppress or limit catalytic properties, the activity of which, as a general rule, decreases with increasing content of alkali metal cations. It is also preferred that the novel compositions have at least 0.4 and more desirably 0.6 to 1.0 equivalent per gram atom of aluminum of positive ions of which at least some are rare earth metal cations. Additionally, in those situations wherein the catalyst composition contains metallic cations other than rare earth metal cations, it is then preferred that they be at least divalent with the cations of divalent metals, such as calcium, magnesium, and manganese being particularly advantageous. Polyvalent metallic ions capable of reduction to lower valence states are also particularly advantageous for dual function catalysts.

A more preferred embodiment of this invention uses rare earth zeolite compositions which have from 0.5 to 1.0 equivalent per gram atom of aluminum of rare earth metal cations. Thus, in the most preferred embodiment of this invention, rare earth metal cations are substantially the only metallic cations associated with the aluminosilicate.

It appears that the rare earth cations tend to impart stability to the aluminosilicate compositions, thereby rendering them far more useful for catalytic purposes, particularly in hydrocarbon conversion processes such as cracking.

The incorporation of the rare earth cations into the zeolite by base-exchange is advantageously effected before the zeolite particles are brought into contact with the matrix.

After the rare earth zeolite is blended with the matrix and dried, the resulting composite is advantageously given a wet treatment to remove the residual alkali metal ions (which may, for example, be present, at this stage in amount of about 1 to 5%, and more usually from about 1 to 3%, based on the zeolite), by further base exchange with materials capable of providing hydrogen ions.

The efficiency of this subsequent treatment is greatly improved if the rare earth zeolite, in finely divided condition, is pretempered by subjecting it to dehydrating conditions, as by calcination, to lower its residual moisture content to a value within the range of 0.3 to 6%, more preferably within the range of 1.5 to 6%, such pretempering being effected before the rare earth zeolite is brought into contact with the matrix. As a result of this pretempering the rare earth zeolite can be later exchanged to a lower sodium content much more easily, it becomes more resistant to loss of crystallinity on contact with acidic media and the relative crystallinity of the final product is higher. In addition the rare earth component becomes more fixed in the crystalline aluminosilicate and more resistant to removal on subsequent base exchanges.

Suitable pretempering conditions are, for example, a temperature of about 650° F. in air for about 60 minutes or a temperature of about 1500° F. in air for about 10 minutes, or a treatment with superheated steam at about 1100-1200° F. at 15 p.s.i.g. for from about 10 to 60 minutes; a preferred treatment is at atmospheric pressure at a temperature of about 1050-1250° F. in steam, air, or a steam-air mixture for from about 10 to 60 minutes. (This pretempering technique is described more fully in U.S. application Ser. No. 459,687, filed May 28, 1965, entitled "Improved Crystalline Zeolites and Method of Preparing Same.")

The mean particle size of the crystalline aluminosilicate incorporated into the matrix is advantageously less than about 40 microns. Preferably the particle size is in the range of about 0.1 to 20 microns, and most preferably from about 2 to 10.

The fine particles of crystalline aluminosilicate are conveniently slurried in a liquid medium, preferably an aqueous liquid, before adding them to the matrix.

Whereas heretofore it had been believed desirable, where the crystalline aluminosilicate is a rare earth zeolite, e.g., rare earth zeolite Y, to utilize in the liquid medium a dissolved rare earth salt such as a rare earth chloride, sulfate, nitrate or the like, we have found that distinctly superior results are obtained by *not* having a rare earth salt present in the liquid medium (or in the resultant rare earth zeolite slurry). Rather, we have found that if *after* the wet treatment to remove residual alkali metal ions (referred to in this column, lines 7-13), such treatment is followed by treatment with rare earth ions (instead of having rare earth ions present in the aforesaid liquid medium), unexpectedly improved results are obtained.

The matrix into which the crystalline aluminosilicate is dispersed is prepared in such a manner that, as charged to the cracking unit, the synthetic amorphous oxide gel (silica gel or silica-zirconia gel) has a pore volume of at least about 0.6 cc./g., and generally from about 0.6 to 1.5 cc./g. A preferred pore volume range is from about 0.8 to 1.3 cc./g., with the most preferred range being from about 1 to 1.2 cc./g.

Increase in pore size increases the effective diffusivity of the resulting catalyst. Also the increase in pore size gives a material which is a more effective cracking catalyst, particularly with heavy gas oils which generally produce relatively large amounts of coke (e.g., oils having a boiling point range of from about 650 to 1050° F.) and wide cut gas oils having a boiling point range of from about 400 to 1000° F. Catalysts made with the large pore size matrices also have longer effective lives and are more resistant to sintering and resistant to decrease in their effective diffusivity with continued use.

The porosity of the matrix can be adjusted so as to obtain the desired pore volume. Thus, increased porosity may be obtained by increasing the time and temperature of ageing of the silica gel, ageing at a pH of 7 to 10, etc. For a more detailed discussion of such prior art techniques for adjusting porosity, see "Control of Physical Structure of Silica-Alumina Catalyst" by Ashley et al., vol. 44, Industrial and Engineering Chemistry, at pages 2861-2863 (December 1952).

The concentration of the matrix in the slurry may be, for example, in the range of about 1 to 15%. As stated previously, the crystalline aluminosilicate is also preferably in slurry form. Its concentration in its slurry may, for example, be in the range of about 1 to 40%.

Advantageously, the amount of crystalline zeolite in the slurry is sufficient to provide a concentration of this component, in the finished catalyst, in the range of about 1 to 80 percent by weight, preferably about 2 to 20 weight percent, and most preferably from about 5 to 10 weight percent.

The particles of crystalline aluminosilicate zeolite are dispersed in the matrix, preferably by a thorough mixing of the slurry of crystalline zeolite with the slurry of matrix, as by pumps and paddles. It is then desirable to filter the blend. Filtration increases the total solids concentration of the blend to over 8%, e.g., typically from about 10 to 12%, and also removes dissolved salts.

The filtered material is then subdivided and dried to form the desired particles. A particularly good method of making microspherical particles (e.g., of particle size of about 1 to 200 microns, the bulk of which are in the range of about 40 to 90 microns) especially suitable for use in fluidized catalytic cracking, is spray drying, preferably under high pressures, e.g., of the order of from about 200 to 2000 p.s.i.g., and preferably from about 1000 to 1500 p.s.i.g.

The spray drying temperature is ordinarily within the range of 200° F. to 1000° F. The temperature used will depend upon such factors as the quantity of material to be dried and the quantity of air used in the drying. The evaporation rate will vary depending on the quantity of air used in the drying. The temperature of the particles which are being dried is preferably within the range of 150° F. to 300° F. at the completion of the drying.

The drying is preferably effected by a process in which the particles to be dried and a hot air stream are moving in the same direction for the entire drying period (concurrent drying), or where the hot air stream flows in the opposite direction (countercurrent drying), or by semi-counter current drying.

After the dried particles have been formed they are given a wet treatment to further remove alkali metal. The most suitable technique for this purpose is to treat the particles with a solution of an ammonium salt, preferably ammonium sulfate, e.g., with water containing about 1-10%, preferably about 2-5%, of ammonium sulfate to remove sodium ions, and then to wash the particles with water. A series of alternating ammonium sulfate and water treatments may be used, ending with a wash with ammonia water (e.g., at a pH of 7-8.5) to remove sulfate ions.

By virtue of the foregoing wet treatment of the dried particles, e.g., with aqueous ammonium sulfate, to further remove alkali metal from the zeolite and matrix, ammonium ions are introduced.

In accordance with our invention, the rare earth-ammonium-zeolite/matrix material is treated with a solution containing either rare earth ions, aluminum ions, or a mixture thereof, so as to replace ammonium and residual alkali metal with rare earth ions and/or aluminum ions.

Treatment with a solution of rare earth ions is preferred. Desirably the rare earth and/or aluminum ions are used as aqueous solutions of water soluble salts thereof, as noted, while aluminum ions are advantageous for such post exchange, rare earth ions are most preferred, e.g., as rare earth chloride hexahydrate.

The foregoing post exchange is carried out using an equivalent amount of cation (rare earth, aluminum, or mixture thereof) equal to at least 50% of the equivalents of alkali metal, e.g., sodium, present in the crystalline zeolite prior to the wet processing treatment with ammonium ions. Preferably, the equivalent amount of the cation employed is equal to 100% of sodium present, i.e., the full stoichiometric amount required to replace all of the sodium present, or is in excess of the stoichiometric amount required. Suitably, the cation is supplied from a solution having a concentration of about 0.1 to 1% by weight of the soluble salts thereof, for example, a rare earth chloride or aluminum sulfate. Desirably, the exchange is conducted at a temperature of from about 60 to 120° F. for a time between about 1 and 60 minutes.

The foregoing is followed with one or more water washes to remove residual sulfate anion and to minimize the chloride content of the finished catalyst.

The particles are then dried in any suitable manner, as by air drying at 250° F.

The finished catalyst is characterized by a residual sodium content not in excess of about 0.2 weight percent, expressed as $Na_2O$, based upon the weight of the dried catalyst. Indeed, a catalyst having a residual sodium content not in excess of about 0.1 weight percent $Na_2O$ may readily be attained, and where the dispersed rare earth zeolite is of the X form (as contrasted to rare earth zeolite Y) the residual sodium level is preferred to be not in excess of about 0.05 weight percent $Na_2O$.

As pointed out previously, it is highly advantageous that the synthetic amorphous oxide gel component (silica gel, silica-zirconia gel, or silica-zirconia-alumina gel) of the matrix be such that, if utilized alone, it would be characterized by substantially no catalytic activity, i.e., have an alpha ($\alpha$) value of less than 0.1, and preferably less than 0.05.

The term "alpha" is well recognized in the art as designating relative catalytic activity. See, in particular, the definition of alpha by P. B. Weisz and J. N. Miale appearing in the Journal of Catalysis, vol. 4, No. 4 (August 1965) at pages 525–529. In the present application reference to "alpha" and to tests for determining alpha values is as defined in the foregoing Weisz and Miale article.

Crystalline aluminosilicate components have been found to have alphas in the range of between about 0.5 to substantially greater than 10,000. Conventional cracking catalysts and other amorphous materials have exhibited alphas generally in the range of about 0.1 to 2.0. By way of contrast, the synthetic amorphous oxide gel component (silica gel or silica-zirconia gel) of our composite catalyst is desirably characterized (based on its use alone) by an alpha ($\alpha$) value of less than 0.1, and preferably by an alpha value of less than about 0.05.

The catalysts of this invention can, by a relatively mild heat treatment, be put in a highly active condition in which they are suitable for direct use in fluid catalytic cracking and in which they exhibit the desired selectivity for producing gasoline, mainly at the expense of the undesirable products of cracking, e.g., dry gas and coke. This heat treatment can take place during regular cracking-regeneration cycles. Thus, when the catalysts are added, as makeup, in an operating fluid catalytic cracking installation they will soon attain their desired selectivity after a few cracking-regeneration cycles, without the need of a preliminary steam-activating step. Alternatively, the catalysts may be given a preliminary heat treatment in air (and in fluidized condition) at a temperature of 1100–1400° F. for from about 3 to 16 hours.

Reference hereinafter will be made to "Heavy Mid-Continent Gas Oil" and/or "Wide Cut Mid-Continent Gas Oil." These oils are more particularly identified in the accompanying table.

PROPERTIES OF MID-CONTINENT GAS OILS

| | HMCGO | WCMCGO |
|---|---|---|
| API gravity | 23.9 | 29.4 |
| Specific gravity, 60/60° F | 0.9106 | 0.8794 |
| Aniline point, ° F | 196.5 | 177.5 |
| Pour point, ° F | | 85 |
| Conradson carbon residue, percent weight | 1.83 | 0.13 |
| Ramsbottom carbon residue, percent weight | | 0.16 |
| Sulfur, percent weight | 0.39 | 0.54 |
| Total nitrogen, percent weight | 0.14 | 0.069 |
| Basic Nitrogen, percent weight | | 0.0251 |
| K.V. at 100° F | 245.9 | |
| K.V. at 210° F | 9.23 | |
| Molecular weight | 408 | 315 |
| Refractive index at 70° C | 1.486 | 1.47067 |
| Density by pycnometer, 70° C., grams/cc | 0.8757 | |
| Hydrocarbon type analysis, aromatics, percent | 43.6 | 32.7 |
| Distillation: | | |
| IBP | 425 | 411 |
| 5 | 604 | 555 |
| 10 | 691 | 580 |
| 20 | 762 | 610 |
| 30 | 807 | 640 |
| 40 | 835 | 671 |
| 50 | 865 | 709 |
| 60 | 895 | 757 |
| 70 | 925 | 794 |
| 80 | 967 | 835 |
| 90 | 1,016 | 895 |
| 95 | 1,022 | 915 |
| Volumetric average boiling point | 861 | 654 |
| Mean average boiling point | 841 | 644 |
| UOP K factor | 11.94 | 11.78 |

The following examples will further illustrate our invention. All parts are by weight unless otherwise stated.

EXAMPLE 1

10% rare earth zeolite Y (REY) in a silica-zirconia-alumina-clay matrix [57% $SiO_2$, 2% $ZrO_2$, 1% alumina, 40% clay]

2125 pounds of Georgia kaolin were added to 54,400 pounds (6550 gallons) of deionized water and the whole was mixed thoroughly. 11,100 pounds (960 gallons) of Q-brand, sodium silicate (containing 3200 pounds $SiO_2$) were added to the water-clay slurry. The sodium silicate was added slowly over a period of thirty minutes while mixing. The clay was uniformly dispersed and coated with sodium silicate. The whole was heated to 120° F. and then sufficient aqueous sulfuric acid (35% wt. $H_2SO_4$) was added while mixing to reduce the pH to 9.8. The temperature was raised to 140° F. and held there for one hour. 78 pounds of aluminum sulfate in 200 gallons of deionized water were slowly added. 330 pounds of zirconium sulfate (as $ZrSO_4 \cdot 4H_2O$) in 250 gallons of deionized water were slowly added. While agitating, additional aqueous sulfuric acid (35 wt. percent $H_2SO_4$) was added to lower the pH to from about 4.0 to 4.5. The whole was kept at this pH for about one hour. 400 pounds of REY (68% exchanged; i.e., 68% of the sodium content had been replaced with rare earth cations), which previously had been calcined at about 1200° F. for about ten minutes, were slurried in 250 gallons of deionized water. (The REY had the following composition: $Al_2O_3$=19.9%; $SiO_2$=60.3%; $(RE)_2O_3$=15.5%; $Na_2O$=4.3%.) This slurry was added to the foregoing silica-zirconia-alumina-clay slurry while mixing. The blend was homogenized and then filtered. The filter cake was spray dried at 1000–1500 p.s.i.g. (inlet gas to spray drier about 800° F. and outlet gases about 300–325° F.) to produce microspheres of from about 1 to 140 microns in diameter, with an average particle size of about 62 microns.

The spray dried particles were then treated on a filter with a 2% aqueous solution of ammonium sulfate at about 110° F.–120° F. to remove sodium. Two such treatments were employed, each using 3500 pounds of 2% aqueous ammonium sulfate solution. Thereafter the particles were washed with water at 90° F. until effluent was free of sulfate ions. The product was then contacted for about 10 minutes at 100° F. with a rare earth chloride solution prepared from 128 pounds of $RECl_3 \cdot 6H_2O$ and 250 gallons of deionized water. A final water wash was then carried out at about 80–110° F. The product was then flash dried at about 212 to 215° F.

The overall composite (10% REY in a 57% $SiO_2$, 2% $ZrO_2$, 40% clay matrix, 1% $Al_2O_3$) analyzed as follows:

| | Wt. percent |
|---|---|
| $SiO_2$[1] | 77.58 |
| $Al_2O_3$ | 18.00 |
| $ZrO_2$ | 1.80 |
| $(RE)_2O_3$ | 2.50 |
| $Na_2O$ | 0.12 |
| Total | 100.00 |

[1] Calculated by difference.

For the composites of this example, the following properties were obtained.

Property (after thermal treatment, 3 hours at 1200° C.):
- Packed density of composite, g./cc. _____ 0.57
- Pore volume of inorganic oxide gel, cc./g. __ 0.68
- Surface area, m.²/g. _____ 360

EXAMPLE 2

10% rare earth zeolite Y (REY) in a silica-zirconia-alumina-clay matrix [57% $SiO_2$, 2% $ZrO_2$, 1% alumina, 40% clay]

2125 pounds of Georgia kaolin were added to 54,400 pounds (6550 gallons) of deionized water and the whole was mixed thoroughly. 11,100 pounds (960 gallons) of Q-brand, sodium silicate (containing 3200 pounds $SiO_2$) were added to the water-clay slurry. The sodium silicate was added slowly over a period of thirty minutes while mixing. The clay was uniformly dispersed and coated with sodium silicate. The whole was heated to 120° F. and then sufficient aqueous sulfuric acid (35% wt. $H_2SO_4$) was added while mixing to reduce the pH to 9.8. The temperature was raised to 140° F. and held there for one hour. 78 pounds of aluminum sulfate in 200 gallons deionized water were slowly added. 330 pounds of zirconium sulfate (as $ZrSO_4 \cdot 4H_2O$) in 250 gallons of deionized water were slowly added. While agitating, additional aqueous sulfuric acid (35 wt. percent $H_2SO_4$) was added to lower the pH to from about 4.0 to 4.5. The whole was kept at this pH for about one hour. 400 pounds of REY (68% exchanged; i.e., 68% of the sodium content had been replaced with rare earth cations), which previously had been calcined at about 1200° F. for about ten minutes, were slurried in a rare earth chloride solution prepared from 128 pounds $RECl_3 \cdot 6H_2O$ and 250 gallons of deionized water. (The REY had the following composition:

$$Al_2O_3 = 19.9\%;\ SiO_2 = 60.3\%;\ (RE)_2O_3 = 15.5\%$$

$Na_2O = 4.3\%$.) This slurry was added to the foregoing silica-zirconia-alumina-clay slurry while mixing. The blend was homogenized and then filtered. The filter cake was spray dried at 1000–1500 p.s.i.g. (inlet gas to spray drier about 800° F. and outlet gases about 300–325° F.) to produce microspheres of from about 1 to 140 microns in diameter, with an average particle size of about 62 microns.

The spray dried particles were then treated on a filter with a 2% aqueous solution of ammonium sulfate at about 110° F.–120° F. to remove sodium. Two such treatments were employed, each using 3500 pounds of 2% aqueous ammonium sulfate solution. Thereafter the particles were washed with water at 90° F. until effluent was free of sulfate ions. The product was then flash dried at about 212 to 215° F.

The overall composite (10% REY in a 57% $SiO_2$, 2% $ZrO_2$, 1% $Al_2O_3$, 40% clay matrix) analyzed as follows:

| | Wt. percent |
|---|---|
| $SiO_2$[1] | 78.18 |
| $Al_2O_3$ | 18.20 |
| $ZrO_2$ | 1.90 |
| $(RE)_2O_3$ | 1.60 |
| $Na_2O$ | 0.12 |
| Total | 100.00 |

[1] Calculated by difference.

For the composites of this example, the following properties were obtained.

Property (after thermal treatment, 3 hours at 1200° C.):
- Packed density of composite, g./cc. _____ 0.58
- Pore volume of inorganic oxide gel, cc./g. __ 0.68
- Surface area, m.²/g. _____ 360

EXAMPLES 3–8

The composite products of Examples 1 and 2 were each divided into three portions. The first portions (Examples 3 and 6) were tested for catalytic performance in cracking Wide-Cut Mid-Continent Gas Oil after thermal treatment in steam at 1400° F. and zero p.s.i.g. for four hours. The second and third portions (Examples 4 and 7, and 5 and 8, respectively) were treated so as to be coked up to various levels. This was done by cracking WCMCGO under standard cracking conditions to obtain a level of about 0.8 weight percent coke on the catalyst, followed by burning off some of the coke by heating at 980° F. in air, until the desired residual coke level was attained. The catalysts were then evaluated with WCMCGO. The conditions and results are set out in Tables 1 and 2, Table 1 showing the data relating to the product of Example 1, and Table 2, the data relating to the product of Example 2.

TABLE 1

| | Example Number | | |
|---|---|---|---|
| | 3 | 4 | 5 |
| Carbon on catalyst at start, weight percent | 0.00 | 0.34 | 0.58 |
| Bench FCC test: 925° F., WCMCGO, 5 C/O, 5 WHSV: | | | |
| Conversion, percent volume | 78.7 | 75.2 | 70.0 |
| $C_5$ plus gasoline, percent volume | 62.6 | 61.0 | 58.3 |
| Total $C_4$'s, percent volume | 17.9 | 16.2 | 13.8 |
| Dry gas, percent weight | 7.9 | 7.8 | 6.7 |
| Coke, percent weight | 3.9 | 2.9 | 2.4 |
| Percent activity loss | | 4.8 | 11.4 |

TABLE 2

| | Example Number | | |
|---|---|---|---|
| | 6 | 7 | 8 |
| Carbon on catalyst at start, weight percent | 0.00 | 0.27 | 0.47 |
| Bench FCC test: 925° F., WCMCGO, 5 C/O, 5 WHSV: | | | |
| Conversion, percent volume | 76.4 | 70.9 | 64.1 |
| $C_5$ plus gasoline, percent volume | 61.3 | 58.1 | 54.0 |
| Total $C_4$'s, percent volume | 16.9 | 14.8 | 12.0 |
| Dry gas, percent weight | 7.5 | 6.8 | 5.9 |
| Coke, percent weight | 3.6 | 2.9 | 2.4 |
| Percent activity loss | | 7.2 | 16.1 |

Comparing the data in Tables 1 and 2, the fresh catalysts (Examples 3 and 6) did not perform equally. The catalyst of Example 3 showed a distinctly higher conversion. Note too that the presence of carbon had a greater adverse effect upon the catalysts of Examples 7 and 8 than upon the corresponding counterparts, Examples 4 and 5, respectively. That is to say, notwithstanding that the catalyst of Example 7 had a carbon level of 0.27 weight percent as contrasted to the higher level of 0.34 for the catalyst of Example 4, the latter catalyst nonetheless gave a superior conversion. The same trend is shown in comparing the catalysts of Examples 7 and 5.

EXAMPLES 9–16

Four catalysts were prepared as described in Example 1 and four as described in Example 2. One of each set of four was evaluated as "fresh" catalyst (Examples 9 and 13). The remainder were treated as described in Examples 3–8 to obtain an initial carbon (coke) level and were thereafter evaluated. The conditions and results are given in Table 3.

TABLE 3

| | Example Number | | | | | | | |
|---|---|---|---|---|---|---|---|---|
| | 9 | 10 | 11 | 12 | 13 | 14 | 15 | 16 |
| | Catalysts prepared as described in Example 1 | | | | Catalysts prepared as described in Example 2 | | | |
| Treatment of catalyst | | Steamed 4 Hr/1,400° F./0 p.s.i.g. | | | | | | |
| Coke on catalyst at start, weight percent | 0.00 | 0.20 | 0.44 | 0.63 | 0.00 | 0.19 | 0.40 | 0.59 |
| Bench FCC test: 925° F., WCMCGO, 5 C/O, 5 WHSV: | | | | | | | | |
| Conversion, percent volume | 78.6 | 75.7 | 70.0 | 64.6 | 75.8 | 70.1 | 63.6 | 55.8 |
| $C_5$ plus gasoline, percent volume | 63.1 | 61.1 | 58.3 | 54.3 | 60.7 | 58.0 | 52.8 | 47.1 |
| Total $C_4$'s, percent volume | 17.2 | 16.6 | 13.1 | 11.8 | 16.3 | 13.6 | 11.9 | 9.9 |
| Dry gas, percent weight | 7.8 | 7.4 | 6.9 | 6.1 | 7.8 | 6.5 | 6.0 | 5.3 |
| Coke, percent weight | 3.7 | 2.7 | 2.8 | 2.3 | 3.4 | 3.1 | 2.7 | 1.9 |

Referring to Table 3, the superiority is manifest for those catalysts made by the procedure of Example 1 as contrasted with those made by the procedure of Example 2. Compare, for example, the data for Examples 9 and 13, 10 and 14, 11 and 15, and 12 and 16.

EXAMPLES 17–20

Two catalysts were prepared as described in Example 1 (Examples 18 and 20) and two were prepared as described in Example 2 (Examples 17 and 19). Each was thermally activated, the conditions of such activation being set out in Table 4. The results are given in Table 4, the superior performance of catalysts made by the procedure of Example 1 being readily apparent.

TABLE 4

| Example Number | 17 | 18 | 19 | 20 |
|---|---|---|---|---|
| Treatment of catalyst | (¹) | (¹) | (²) | (²) |
| Bench FCC test: 925° F., WCMCGO, 5 C/O, 5 WHSV: | | | | |
| Conversion, percent volume | 75.8 | 78.6 | 60.0 | 67.3 |
| $C_5$ plus gasoline, percent volume | 60.7 | 63.1 | 50.0 | 54.7 |
| Total $C_4$'s, percent volume | 16.3 | 17.2 | 11.9 | 14.2 |
| Dry gas, percent weight | 7.8 | 7.8 | 5.5 | 6.5 |
| Coke, percent weight | 3.4 | 3.7 | 2.2 | 2.9 |
| Physical properties: | | | | |
| Pore volume, cc./g | 0.57 | 0.58 | 0.55 | 0.60 |
| Packed density, g./cc | 0.62 | 0.61 | 0.63 | 0.61 |
| Surface area, m.²/g | | 197 | 113 | 128 |

¹ Steamed 4 hrs./1,400° F./0 p.s.i.g.
² Steamed 5 hrs./1,400° F./15 p.s.i.g.

Our catalysts may also be advantageously employed for the catalytic hydrocracking of petroleum stocks, according to processes of the type commercially employed under conditions well-known to the art. The catalysts of the present invention may be combined with a hydrogenation component, either by impregnation, base exchange (preferably followed by reduction of the hydrogenation cation to the metal), admixture or the like, to form a hydrocracking catalyst of exceptional catalytic activity, selectivity and stability, and of excellent physical characteristics. Suitable hydrogenation components may be selected from the group consisting of oxides of metals, sulfides of metals and metals of Groups VI and VIII of the Periodic Table. Representative of these metals are molybdenum, cobalt, chromium, tungsten, iron, nickel, the platinum group metals, as well as combinations of these metals, their oxides or sulfides. The hydrogenation component is present in the final hydrocracking composite comprising by weight between about 0.1 and 25 percent of the composite.

The catalysts of our invention are also highly suitable for the catalytic reforming of petroleum stocks, according to processes of the type commercially employed under conditions well-known to the art. The catalysts of the present invention may be combined by suitable method with a hydrogenation component, preferably platinum, comprising by weight between about 0.3 and 1.0 percent of the final reforming composite.

EXAMPLES 21 AND 22

10% rare earth zeolite Y (REY) in a silica-zirconia-alumina-clay matrix [58% $SiO_2$, 2% $ZrO_2$, 40% clay]

This example (Example 21) was similar to Example 1, but illustrates a final ion exchange with aluminum ions rather than rare earth ions.

2125 pounds of Georgia kaolin were added to 54,400 pounds (6550 gallons) of deionized water and the whole was mixed thoroughly. 11,100 pounds (960 gallons) of Q-brand, sodium silicate (containing 3200 pounds $SiO_2$) were added to the water-clay slurry. The sodium silicate was added slowly over a period of thirty minutes while mixing. The clay was uniformly dispersed and coated with sodium silicate. The whole was heated to 120° F. and then sufficient aqueous sulfuric acid (35% wt. $H_2SO_4$) was added while mixing to reduce the pH to 9.8. The temperature was raised to 140° F. and held there for one hour. 78 pounds of aluminum sulfate in 200 gallons of deionized water were slowly added. 330 pounds of zirconium sulfate (as $ZrSO_4 \cdot 4H_2O$) in 250 gallons of deionized water were slowly added. While agitating, additional aqueous sulfuric acid (35 wt. percent $H_2SO_4$) was added to lower the pH to from about 4.0 to 4.5. The whole was kept at this pH for about one hour. 400 pounds of REY (68% exchanged; i.e., 68% of the sodium content had been replaced with rare earth cations), which previously had been calcined at about 1200° F. for about ten minutes, were slurried in 250 gallons of deionized water. (The REY had the following composition: $Al_2O_3 = 19.9\%$; $SiO_2 = 60.3\%$;

$$(RE)_2O_3 = 15.5$$

$Na_2O = 4.3\%$.) This slurry was added to the foregoing silica-zirconia-alumina-clay slurry while mixing. The blend was homogenized and then filtered. The filter cake was spray dried at 1000–1500 p.s.i.g. (inlet gas to spray drier about 800° F. and outlet gases about 300–325° F.) to produce microspheres of from about 1 to 140 microns in diameter, with an average particle size of about 62 microns.

The spray dried particles were then treated on a filter with a 2% aqueous solution of ammonium sulfate at about 110° F.–120° F. to remove sodium. Two such treatments were employed, each using 3500 pounds of 2% aqueous ammonium sulfate solution. Thereafter the particles were washed with water at 90° F. until effluent was free of sulfate ions. The product was then contacted for about 10 minutes at 100° F. with an aluminum sulfate solution prepared from 42.7 pounds of $Al_2(SO_4)_3$ and 250 gallons of deionized water. A final water wash was then carried out at about 80–110° F. The product was then flash dried at about 212 to 215° F.

The overall composite (10% REY in a 58% $SiO_2$,

2% ZrO$_2$, 40% clay matrix) analyzed for sodium and rare earth as follows:

| | Wt. percent |
|---|---|
| (RE)$_2$O$_3$ | 1.7 |
| Na$_2$O | 0.07 |

A "control" catalyst (Example 22) was prepared in a manner similar to that described in preparing for the composite of Example 21. For the "control," however, the treatment with aluminum sulfate was not included. That is to say, following the two treatments with aqueous ammonium sulfate solution and the subsequent water wash, the composite product was then flash dried (at about 212 to 215° F.).

The "control" composite (10% REY in a 58% SiO$_2$, 2% ZrO$_2$, 40% clay matrix) analyzed for sodium and rare earth as follows:

| | Wt. percent |
|---|---|
| (RE)$_2$O$_3$ | 1.2 |
| Na$_2$O | 0.08 |

The composites of Examples 21 and 22 were each tested for catalytic performance in cracking Wide-Cut Mid-Continent Gas oil after thermal treatment in steam at 1400° F. and zero p.s.i.g. for four hours. The results were as follows:

| | Example | |
|---|---|---|
| | 21 | 22 |
| Bench FCC Test: 925° F., WCMCGO, 5 C/O, 5 WHSV: | | |
| Conversion, percent volume | 73.0 | 66.9 |
| C$_5$ plus gasoline, percent volume | 60.3 | 54.8 |
| Total C$_4$'s, percent volume | 15.4 | 14.3 |
| Dry gas, percent weight | 6.6 | 6.0 |
| Coke, percent weight | 3.0 | 2.6 |

The improved results when using the catalyst of Example 21, as reflected by higher conversion and higher yield of C$_5$+ gasoline, are readily apparent.

Our crystalline aluminosilicate composites have also been found to be excellent alkylation catalysts of exceptional activity, particularly for the alkylation of aromatics with olefins. High alkylation activity is imparted in part by calcination at particular temperatures, for example, rare earth zeolite X, at 300–600° C.; rare earth zeolite Y, at 200–400° C.; and hydrogen zeolite Y at 400–650° C. Such alkylation catalysts are also excellent for isomerization and other related conversions. Alkylation and isomerization may be effected by contact with the above catalysts under conditions well-known to the art, at temperatures below about 600° F.

While the foregoing description has been with respect to the preparation of our catalysts and matrices in fluid form, it will, of course, be apparent that they may also be embodied in other physical forms. For instance, the catalysts or the matrices may readily be employed as pellets, beads, pills, extrudates, or the like.

Variations can, of course, be made without departing from the spirit of our invention.

Having thus described our invention, what we desire to secure and claim by Letters Patent is:

1. In a process for preparing a catalyst comprising admixing an alkali metal silicate with a particulate weighting agent selected from the group consisting of clay, alpha alumina, and zircon, so as to coat said particles with alkali metal silicate, ageing the admixture at a pH of from about 8 to 10, reducing the pH to from about 4 to 7 to form a silica gel-weighting agent matrix, admixing a particulate crystalline rare earth aluminosilicate zeolite with said matrix so as to disperse said zeolite particles therein to form a composite, the crystalline zeolite having a sodium content of less than 4% by weight, drying in the form of composite particles suitable for fluid catalytic conversion, and treating said composite particles with a solution containing ammonium ions so as to reduce the alkali metal content of said composite, the improvement comprising, following said treatment with ammonium ions, ion exchanging said composite particles with a solution containing rare earth ions, aluminum ions, or mixtures thereof, so as to substantially remove ammonium ions and residual alkali metal ions therefrom and replace such ions with said rare earth ions, aluminum ions, or mixtures thereof.

2. The process of claim 1 wherein, after said ageing at a pH of from about 8 to 10 and prior to reducing the pH from about 4 to 7, a source of zirconium ions is added, so that the subsequent reduction of pH results in the formation of a silica gel-zirconia gel-weighting agent matrix.

3. The process of claim 2 wherein, after said ageing of from about 8 to 10 and prior to reducing the pH to about 4 to 7, a source of aluminum ions is added, so that the subsequent reduction of pH results in the formation of a silica gel-alumina gel-zirconia gel-weighting agent matrix.

4. The process of claim 1 wherein said solution contains rare earth ions.

5. The process of claim 4 wherein the solution containing said rare earth ions is employed in such amount and concentration as to contain at least 50 percent of the rare earth ions stoichiometrically required for replacement of the alkali metal ions present in said composite prior to said exchange with ammonium ions.

6. The process of claim 5 wherein said pH of 8 to 10 out at a temperature of from about 100 to 160° F. for from about 1 to 6 hours.

7. The process of claim 5 wherein said pH of 8 to 10 and said pH of 4 to 7 are each attained by the addition of sulfuric acid.

8. The process of claim 1 wherein said weighting agent is clay.

9. The process of claim 8 wherein said clay is kaolin clay.

10. The process of claim 1 wherein said crystalline rare earth aluminosilicate zeolite particles are either crystalline rare earth Y aluminosilicate or crystalline rare earth X aluminosilicate.

11. The process of claim 10 wherein said rare earth zeolite particles are rare earth Y aluminosilicate zeolite particles, and wherein said mixing of said zeolite particles with said matrix is effected in the absence of a solution of rare earth ions.

12. A process for catalytically converting petroleum stocks comprising contacting a petroleum charge stream under catalytic conversion conditions with a catalyst made by the method of claim 1.

13. The process of claim 12 wherein the conversion process is catalytic cracking.

References Cited
UNITED STATES PATENTS

| 2,763,622 | 9/1956 | Plank et al. | 252—451 |
| 3,312,615 | 4/1967 | Cramer et al. | 252—455 |
| 3,346,512 | 10/1967 | Gladrow et al. | 252—455 |
| 3,455,842 | 7/1969 | Cornelius et al. | 252—455 |

DANIEL E. WYMAN, Primary Examiner

C. F. DEES, Assistant Examiner

U.S. Cl. X.R.

252—453, 455

Disclaimer 3,556,988.—*William A. Stover*, Woodbury, and *Harry A. McVeigh*, Gibbstown, N.J. METHOD OF PREPARING COMPOSITE CATALYST AND HYDROCARBON CONVERSION THEREWITH. Patent dated Jan. 19, 1971. Disclaimer filed Nov. 23, 1970, by the assignee, *Mobil Oil Corporation*.

Hereby disclaims the terminal portion of the term of said patent subsequent to Jan. 5, 1988.

[*Official Gazette April 20, 1971.*]

PO-1050
(5/69)

UNITED STATES PATENT OFFICE
CERTIFICATE OF CORRECTION

Patent No. 3,556,988      Dated January 19, 1971

Inventor(s) WILLIAM A. STOVER and HARRY A. MC VEIGH

It is certified that error appears in the above-identified patent and that said Letters Patent are hereby corrected as shown below:

Col. 7, line 43 - "rides, As" should be --rides. As--

Col. 18, line 31 - "said pH of 8 to 10" should be --said ageing is carried--

Signed and sealed this 22nd day of June 1971.

(SEAL)
Attest:

EDWARD M. FLETCHER, JR.
Attesting Officer

WILLIAM E. SCHUYLER, JR.
Commissioner of Patents